(12) United States Patent
Beyer et al.

(10) Patent No.: US 6,528,590 B1
(45) Date of Patent: Mar. 4, 2003

(54) AQUEOUS COPOLYMER DISPERSION, ITS METHOD OF PRODUCTION AND ITS USE

(75) Inventors: Dierk Beyer, Frankfurt (DE); Volker Renisch, Hofheim (DE); Rolf Kuropka, Selzen (DE); Susana Maria De Almeida Carvalho, Oeiras (PT)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/868,609

(22) PCT Filed: Dec. 9, 1999

(86) PCT No.: PCT/EP99/09672

§ 371 (c)(1),
(2), (4) Date: Oct. 5, 2001

(87) PCT Pub. No.: WO00/37516

PCT Pub. Date: Jun. 29, 2000

(30) Foreign Application Priority Data

Dec. 19, 1998 (DE) .......................................... 198 58 851

(51) Int. Cl.⁷ ............................................. C08F 220/12
(52) U.S. Cl. ...................... 525/227; 525/393; 524/561; 524/731; 524/733
(58) Field of Search .............................. 525/227, 393; 524/561, 731, 733

(56) References Cited

U.S. PATENT DOCUMENTS

| | | | |
|---|---|---|---|
| 3,320,198 A | * 5/1967 | Hill et al. .................. | 260/29.6 |
| 5,030,670 A | 7/1991 | Hess et al. | |
| 5,208,282 A | 5/1993 | Rehmer et al. | |
| 5,439,970 A | 8/1995 | Reeb | |
| 5,665,816 A | 9/1997 | Gerharz et al. | |
| 5,681,880 A | 10/1997 | Desor et al. | |
| 5,708,093 A | 1/1998 | Bastelberger et al. | |
| 5,763,012 A | * 6/1998 | Zhao et al. ............. | 427/393.5 |
| 5,955,005 A | 9/1999 | Heller et al. | |

FOREIGN PATENT DOCUMENTS

| | | |
|---|---|---|
| DE | 43 41 260 | 5/1994 |
| DE | 43 06 831 | 9/1994 |
| DE | 44 37 879 | 5/1995 |
| DE | 197 52 436 | 5/1998 |
| DE | 197 57 494 | 7/1998 |
| EP | 0 209 831 | 1/1987 |
| EP | 0 458 144 | 11/1991 |
| EP | 0 599 676 | 6/1994 |
| EP | 0 778 296 | 6/1997 |
| FR | 2 697 530 | 5/1994 |

OTHER PUBLICATIONS

International Search Report for International Application No. PCT/EP99/9762; Jun. 4, 2000.
English Translation of the Abstract of EP 0 458 144.
English Translation of the Abstract of EP 0 599 676.
English Translation of the Abstract of FR 2 697 530.
English translation for DE 4341260, May 11, 1994.
English translation for DE 4437879, May 18, 1995.
English translation for DE 19757494, Jul. 23, 1998.
English translation for DE 19752436, May 27, 1999.
U.S. Ser. No. 09/720,065, filed Jun. 16, 1999, Danner et al.

* cited by examiner

Primary Examiner—James J. Seidleck
Assistant Examiner—Olga Asinovsky
(74) Attorney, Agent, or Firm—Anthony A. Bisulca

(57) ABSTRACT

The present invention relates to an aqueous copolymer dispersion consisting essentially of A) an aqueous dispersion of a copolymer having a solids content of from 20 to 65% by weight, said copolymer being composed of various monomers and the weight fractions of the various monomers being chosen within the stated limits such that a synthetic resin composed of these monomers alone would have a glass transition temperature in the range from −50 to 35° C., B) from 0 to 10% by weight, based on the copolymer A, of benzophenone, acetophenone, one or more acetophenone derivatives or benzophenone derivatives without an ethylenically unsaturated group, or a mixture thereof, C) from 0.3 to 10% by weight, based on the copolymer A, of emulsifiers, and D) from 0 to 5% by weight, based on the copolymer A, of protective colloids;

to a process for its preparation and to its use.

14 Claims, No Drawings

AQUEOUS COPOLYMER DISPERSION, ITS METHOD OF PRODUCTION AND ITS USE

The present invention relates to novel aqueous copolymer dispersions, to processes for preparing them and to their use in particular in elastic coatings.

EP-A-0 458 144 discloses aqueous synthetic resin dispersions whose synthetic resins contain in copolymerized form not only monomers such as acrylic or methacrylic esters, styrene and vinyl esters, monoethylenically unsaturated acetophenone derivatives and/or benzophenone derivatives but also at least one unsaturated ketone or one aldehyde, and also comprise a compound containing at least two acid hydrazide groups, and are obtained by free-radical emulsion polymerization. These synthetic resin dispersions are recommended for coating, adhesive bonding, sealing, and impregnating.

The use of relatively expensive monoethylenically unsaturated acetophenone derivatives and/or benzophenone derivatives, and of unsaturated ketone derivatives and/or aldehyde derivatives and a compound containing at least two acid hydrazide groups which is added subsequently, means that the corresponding synthetic resin is itself relatively expensive. A disadvantage of these synthetic resins is that films thereof, despite attaining high values of elongation at break, lack sufficient resilience following a defined extension, either through application of a defined weight or following extension by a defined distance, and remain, accordingly, in the extended state. A further disadvantage of coatings comprising these synthetic resins is that they frequently prove to be of poor stability to water exposure a short time following their application to the substrate, and exhibit high water absorption. Furthermore, these coatings in many cases exhibit a strong tendency toward reemulsification and/or blistering after brief exposure to water vapor.

EP-A-0 599 676 discloses aqueous polymer dispersions whose synthetic resins include not only monomers such as acrylic or methacrylic esters and styrene but also monoethylenically unsaturated acetophenone derivatives and/or benzophenone derivatives and also have an oxygen-reactive dicyclopentadienyl group. These synthetic resin dispersions are recommended for elastic coatings.

Disadvantages of these binders are that the process of crosslinking of paint films of these binders is relatively slow to proceed, and the paint lacks adequate elasticity in the sense of resilience following cracking-induced extension of the paint. Furthermore, stark differences may arise in the properties of a coating based on such synthetic resins depending on whether it is applied to the sun-facing side of a building or to an area not exposed to the sun. Furthermore, during the preparation of the synthetic resin dispersions by means of free-radical polymerization, allylic double bonds have an inhibiting action and so hinder the preparation of these dispersions.

EP-A-0 778 296 relates to aqueous polymer dispersions whose synthetic resins contain in copolymerized form not only monomers such as acrylic or methacrylic esters but also methylstyrene or other alkyl-substituted styrenes and, optionally, acrylonitrile. These synthetic resin dispersions are recommended as binders for elastic coatings and sealing compounds.

Disadvantages of these binders are that the process of crosslinking of paint films of these binders is relatively slow to proceed under the influence of light, and the paint lacks adequate elasticity in the sense of resilience following cracking-induced extension of the paint. Furthermore, stark differences may arise in the properties of a coating based on such synthetic resins depending on whether it is applied to the sun-facing side of a building or to an area not exposed to the sun. A further disadvantage of coatings with these synthetic resins is that they are in many cases of poor stability to water exposure shortly after application to the substrate. Furthermore, these coatings in many cases exhibit a strong tendency toward reemulsification and/or toward blistering following brief exposure to water vapor. The use of acrylonitrile in these binders results, moreover, both in a readiness toward yellowing and in poor stability of the coatings with respect to basic substrates owing to hydrolysis of the acrylonitrile group in the copolymer, which leads to a greatly increased sensitivity to water.

It was an object of the present invention, therefore, to develop a synthetic resin which features, in the coating, both low water absorption and particularly low reemulsifiability following treatment with water vapor, in combination with good elongation at break and good relaxation following defined extension.

This object is achieved by an aqueous copolymer dispersion consisting essentially of A) an aqueous dispersion of a copolymer having a solids fraction of from 20 to 65% by weight, said copolymer being composed of
  a) from 40 to 99.9% by weight, preferably from 65 to 85% by weight, of at least one ester of a,p-monoethylenically unsaturated carboxylic acids containing 3 to 6 carbon atoms and alkanols containing 1 to 18 carbon atoms and from 0 to 40% by weight, preferably from 15 to 35% by weight, of at least one vinylaromatic compound (monomers a),
  b) from 0.05 to 10% by weight of at least one $\alpha,\beta$-monoethylenically unsaturated mono- or dibasic acid containing 3 to 8 carbon atoms, and/or anhydrides thereof, and from 0 to 10% by weight of at least one $\alpha,\beta$-monoethylenically unsaturated carboxamide which contains 3 to 8 carbon atoms and can be substituted once or twice on the nitrogen by alkyl ether sulfates, alkyl sulfates, alkanols or alkyls containing up to 5 carbon atoms (monomers b),
  c) from 0.05 to 10% by weight of at least one monoethylenically unsaturated crosslinking monomer (monomers c), and
  d) from 0 to 30% by weight of at least one other copolymerizable monoethylenically unsaturated monomer (monomers d), in copolymerized form,
  the weight fractions of the monomers a, b, c and d being chosen within the stated limits such that a synthetic resin composed of these monomers alone would have a glass transition temperature in the range from −50 to 35° C., preferably from −40 to 10° C. and, with particular preference, from −30 to −10° C., B) from 0 to 10% by weight, preferably from 0.02 to 2% by weight, based on the copolymer A, of benzophenone, acetophenone, one or more acetophenone derivatives or benzophenone derivatives without an ethylenically unsaturated group, or a mixture thereof, C) from 0.3 to 10% by weight, based on the copolymer A, of emulsifiers, and D) from 0 to 5% by weight, preferably from 0.05 to 5% by weight, based on the copolymer A, of protective colloids.

The compounds used as esters of $\alpha,\beta$-monoethylenically unsaturated carboxylic acids containing 3 to 6 carbon atoms and alkanols containing 1 to 18 carbon atoms are preferably the esters of acrylic and/or methacrylic acid. Of these, particular importance is attached to the esters of methanol, of ethanol, of the propanols, of the butanols, of the pentanols, of 2-ethylhexanol, of isooctanol, of n-decanol and of n-dodecanol. Preferred vinylaromatic compounds are styrene, methylstyrene, ethylstyrene, dimethylstyrene, diethylstyrene and trimethylstyrene, particular preference being given to styrene.

The compounds used as α,β-monoethylenically unsaturated mono- or dibasic acids containing 3 to 8 carbon atoms are preferably α,β-monoethylenically unsaturated carboxylic acids and their water-soluble derivatives; with particular preference, acrylic acid, methacrylic acid, ethacrylic acid, itaconic acid, fumaric acid and maleic acid, and their anhydrides. Also suitable, furthermore, are the amides and monoamides of these acids, preference among these being given to acrylamide and methacrylamide and also their N-substituted derivatives such as N,(N'-di)methyl(meth) acrylamide, N,(N'-di)ethyl(meth)acrylamide and N,(N'-di) isopropyl(meth)acrylamide. Methacrylamide is particularly preferred. Acrylamide derivatives which are substituted once or twice on the nitrogen by alkyl, alkanol, alkyl sulfate or alkyl ether sulfate radicals containing up to 5 carbon atoms may also be present. In addition, vinylsulfonic acid, vinylphosphonic acid, acrylamidoglycolic acid and methacrylamidoglycolic acid are very suitable. These synthetic resins preferably contain in copolymerized form 0.3 to 5% by weight of the monomers b. Particular preference is given to a mixture of acrylic acid and methacrylic acid as monomers b, in particular a mixture of acrylic acid, methacrylic acid and methacrylamide.

Preferred monomers c are silanes of the formula $CH_2=CH-Si(OX)_3$ in which X is a hydrogen atom, an acyl group and/or an alkyl group having not more than three carbon atoms. Vinyltrimethoxysilane, vinyltriethoxysilane and vinyltris-2-methoxysilane are particularly preferred. Further preferred monomers c are silanes of the formula $CH_2=CZ-COO-Y-Si(OX)_3$, in which Z is a hydrogen atom or a methyl and/or ethyl group, Y is a group $C_nH_{2n}$ where n=2 to 6, and X is a hydrogen atom, an acyl group and/or an alkyl group having not more than three carbon atoms, with particular preference α-methacryloxypropyltrimethoxysilane, and also glycidyl (meth)acrylates or other ethylenically unsaturated derivatives of glycidol, such as glycidyl vinyl ether, for example. It is possible, furthermore, to use monomers containing keto groups, such as acetoacetoxy-functional monomers, examples being acetoacetoxyethyl methacrylate, acetoacetoxybutyl methacrylate, acrylamidomethylacetylacetone and vinyl acetoacetate, polymerizable derivatives of diacetone, such as diacetoneacrylamide and diacetonemethacrylamide, and also acrolein. Further candidates for use as monomers c are alkoxyvinylsilanes, (meth) acryloyloxy-alkylsilanes, (meth)acryloyloxyalkyl-sulfonates, sulfates or phosphates, ethenesulfonate and polymerizable ethyleneurea derivatives, such as N-(β-(meth)acryloxyethyl)-N,N'-ethyleneurea and N-(β-acrylamidoethyl)-N,N'-ethyleneurea.

As monomers d it is preferred to use acrylic or methacrylic esters of diols, such as, for example, hydroxyalkyl (meth)acrylates, especially hydroxyethyl acrylate or 1,4-butanediol monoacrylate, and also acrylic or methacrylic esters of tetrahydrofurfuryl alcohol, halogen-containing monomers such as vinyl chloride and vinylidene chloride, unsaturated hydrocarbons such as ethylene, propylene, isobutene, butadiene and isoprene, and lower vinyl ethers. Unsaturated nitrogen compounds can likewise be used as monomers d, such as N-vinylformamide, N-vinylpyrrolidone, tetrahydrofurfurylamine, acrylonitrile and methacrylonitrile, and also the ureido monomers such as β-ureidoethyl acrylate, β-ureidoethyl vinyl ether, N-dimethylaminoethyl-N'-vinyl-N,N'-ethyleneurea and N-methylaminoethyl-N'-vinyl-N,N'-ethyleneurea. Also suitable are the monoesters of α,β-monoethylenically unsaturated dicarboxylic acids containing 4 to 8 carbon atoms and alkanols containing 5 to 20 carbon atoms.

Particular interest attaches to synthetic resins A whose monomer components a, b, c and d are selected such that a synthetic resin composed of these monomers alone would have a glass transition temperature of from −40 to 10° C., in particular from −30 to −10° C. According to Fox (T. G. Fox, Bull. Am. Phys. Soc. (Ser. II) 1, 123 [1956]) the glass transition temperature of copolymers is given in good approximation by $$\frac{1}{Tg} = \frac{X^1}{Tg^1} + \frac{X^2}{Tg^2} + \ldots \frac{X^S}{Tg^S}$$

where $X^1, X^2, \ldots, X^S$ are the mass fractions of the monomers 1,2, ..., s and $Tg^1, Tg^2, \ldots Tg^S$ are the glass transition temperatures of the homopolymers of each of the monomers 1,2, ... or s, in degrees Kelvin. The glass transition temperatures of the homopolymers composed of the monomers a and b, respectively, are essentially known and are listed, for example, in J. Brandrup, E. H. Immergut, Polymer Handbook, $1^{st}$ Ed., J Wiley, New York, 1966, and $2^{nd}$ Ed. J. Wiley, New York, 1975.

Acetophenone, benzophenone and also acetophenone derivatives or benzophenone derivatives containing no ethylenically unsaturated groups have proven suitable as component B. Particular preference is given to the use of benzophenone and/or a benzophenone derivative without an ethylenically unsaturated group; mixtures of benzophenone and suitable auxiliary substances that are liquid at room temperature are particularly advantageous from a technical standpoint. Mixtures of this kind are known inter alia from EP-A-0 209 831.

The fraction of component B, based on the copolymer A, is preferably in the range from 0.05 to 5% by weight. Component B is incorporated judiciously by stirring, preferably with heating, into an initial dispersion containing at least one synthetic resin A. In this case the incorporation of component B by copolymerization is avoided, so as to achieve only surface crosslinking under atinic light in the fully formulated coating, whereas the properties of the coating are obtained by internal crosslinking with the monomers c. The incorporation of unsaturated benzophenone derivatives by copolymerization would bring about a more uniform distribution of the benzophenone functionalities but at the same time would result in a deterioration in the elastic properties following prolonged irradiation with atinic light, since subsequent internal crosslinking would take place in the film.

As emulsifiers C it is preferred to use nonionic and/or ionic emulsifiers.

Examples of nonionic emulsifiers which can be used are alkyl polyglycol ethers such as ethoxylation products of lauryl, oleyl or stearyl alcohol or of mixtures such as coconut fatty alcohol; alkylphenol polyglycol ethers such as ethoxylation products of octyl- or nonylphenol, diisopropylphenol, triisopropylphenol or of di- or of tri-tertbutylphenol; or ethoxylation products of polypropylene oxide.

Suitable ionic emulsifiers are preferably anionic emulsifiers. These can be the alkali metal salts or ammonium salts of alkyl-, aryl- or alkylaryl-sulfonates, alkyl, aryl or alkylaryl sulfates or phosphates, or alkyl-, aryl- or alkylarylphosphonates or compounds with other anionic end groups, it also being possible for oligoethylene oxide or polyethylene oxide units to be present between the hydrocarbon radical and the anionic group. Typical examples are sodium lauryl sulfate, sodium undecyl glycol ether sulfate, sodium lauryl diglycol sulfate, sodium tetradecyl triglycol sulfate, sodium octylphenol glycol ether sulfate, sodium dodecylbenzenesulfonate, sodium lauryl diglycol sulfate, and ammonium tri-tert-butylphenol penta- or octaglycol sulfate.

Compounds used as protective colloids D are preferably water-soluble carboxymethylcelluloses having a degree of substitution of from 0.4 to 2.9, preferably 0.4 to 1.5 and, with particular preference from 0.6 to 1.4, the degree of substitution denoting the average number of carboxymethyl groups introduced per anhydroglucose unit, whose 2% strength aqueous solutions have a Brookfield viscosity (20 rpm) at 25° C. of less than 2000 (with spindle 3), preferably below 500 (with spindle 2) and, with particular preference, below 100 (with spindle 1) mpas. The carboxymethylcellulose is preferably used in the form of its ammonium or alkali metal salt. Examples of suitable commercial products are Blanose 7M®, Blanose 7UL® and Blanose 7EL® from Clariant GmbH, and also Ambergum 3021® from Aqualon. The carboxymethylcelluloses of the invention can if desired include further substituents as well, especially alkyl or hydroxyalkyl radicals having 1 to 4 carbon atoms, alkyloxyalkyl radicals having 2 to 6 carbon atoms or dialkylamino radicals having a total of 2 to 6 carbon atoms. Examples of particularly suitable compounds are methylcarboxymethylcellulose, ethylcarboxymethylcellulose, hydroxyethylcarboxymethylcellulose, hydroxypropylcarboxymethylcellulose, methoxyethylcarboxymethylcellulose, ethoxyethylcarboxymethylcellulose and diethylaminocarboxymethylcellulose. Examples of further protective colloids which can be used are high molecular mass compounds such as polyvinyl alcohols, polyvinylpyrrolidones, polyacrylamides, polymethacrylamides, polycarboxylic acids or their alkali metal and/or ammonium salts.

The polymers to be used as synthetic resins A can be prepared by the known methods of free-radical bulk, solution, suspension and emulsion polymerization. The preferred mode of preparation of the aqueous synthetic resin formulation of the invention is, however, the aqueous form, and it is therefore advisable to use the synthetic resin A in this form as well. Accordingly, said resin is prepared preferably by polymerizing the respective monomers in an aqueous medium under the known conditions of free-radical emulsion polymerization in the presence of water-soluble free-radical initiators and emulsifiers C and also, if desired, in the presence of protective colloids D, regulators and/or further auxiliaries. The polymerization is conducted in accordance with the customary techniques of emulsion polymerization, by emulsifying the monomers in the aqueous phase in the presence of emulsifiers, initiators and the protective colloid and polymerizing them at temperatures from 60 to 95° C. The emulsion polymerization can be conducted in accordance with the customary techniques known to the skilled worker, such as batch, monomer metering or emulsion feed techniques. It is preferred to operate in accordance with the emulsion feed technique, in which a small amount of the monomers is subjected to initial polymerization and then the remaining amount of monomers is metered in as an aqueous emulsion. If desired, it is also possible for a plurality of different monomer emulsions to be metered in one after another. Like the emulsifier, the protective colloid can be included partly in the initial charge to the reactor and/or metered in with the monomer emulsion.

The preparation of high-quality dispersions in accordance with the present invention presupposes the application of the knowledge which exists in the field of emulsion polymerization, even where that knowledge is not described here. Failure to observe the rules known to the skilled worker in the art of emulsion polymerization can therefore adversely affect important properties, an example being the water resistance of the dispersion films. Based on the amount of polymer, therefore, the dispersions should not substantially exceed the amounts preferably used of up to 3% by weight, with particular preference up to 2% by weight, of ionic emulsifiers and/or of up to 6% by weight, with particular preference up to 4% by weight, of nonionic emulsifiers. In particular, use is made only of ionic emulsifiers in an amount of $\leq 2\%$ by weight.

In order to initiate and carry out the polymerization use is made of oil-soluble and/or, preferably, water-soluble free-radical initiators or redox systems. Suitable examples are hydrogen peroxide, potassium, sodium or ammonium peroxodisulfates, dibenzoyl peroxide, lauryl peroxide, tri-tert-butyl peroxide, bisazodiisobutyronitrile, alone or together with reducing components, e.g., sodium bisulfite, Rongalit®, glucose, ascorbic acid, and other compounds having a reducing action. Particular preference is given to the use of peroxodisulfates.

In the emulsion polymerization the temperature is generally from 30 to 90° C., preferably from 50 to 90° C., and the polymerization initiators are used typically in amounts of from 0.1 to 10% by weight, based on the total amount of monomers.

It is further possible to use regulators, such as mercaptans, especially n-dodecyl mercaptan, thiophenol, and 2-methyl-5-tert-butylthiophenol. Amounts of from 0 to 1 by weight, preferably from 0 to 0.5% by weight, are typically used, and with particular preference the dispersion is prepared using $\leq 0.3\%$ by weight of a regulator.

The dispersions are typically adjusted to a pH of from 6.5 to 10, preferably from 7.0 to 9.0, using aqueous ammonia solutions, alkali metal hydroxide solutions and alkaline earth metal hydroxide solutions.

If desired, the dispersion may further comprise film forming auxiliaries, such as white spirit, Texanol®, butyldiglycol and butyldipropylene glycol, plasticizers, such as dimethyl phthalate and dibutyl phthalate, dispersants such as polyacrylic acids and corresponding copolymers such as, for example, Lopon 890® and Dispex G40®, thickeners based on polyacrylates or polyurethanes such as, for example, Borchigel L75® and Tafigel PUR 40®, preservatives, defoamers such as, for example, mineral oil or silicone defoamers, wetting agents, such as aminomethylpropanol, and other additives typical in formulating coating compositions.

The synthetic resin formulations of the invention are particularly suitable for use in coating compositions for walls, floors and ceilings, as elastic binders for leather fibers, and as marking paints for paths and highways, and also in renders, where they ensure durable bridging of cracks, low tack and low soiling tendency, and good resistance to water.

The present invention is described in more detail below with reference to working examples but without being restricted thereby.

EXAMPLE 1

Preparation of an Aqueous Copolymer Dispersion

A monomer mixture of 50 g of n-butyl acrylate, 20 g of ethylhexyl acrylate, 27 g of styrene, 2 g of methacrylic acid and 1 g of vinyltrimethoxysilane with 1.8 g of the Na salt of $C_{12}$-alkyl triglycol ether sulfate is emulsified in 100 g of water.

Subsequently, 10% of an aqueous solution of 0.5 g of sodium peroxodisulfate in 10 g of water is added to 10% of the aqueous emulsion and this mixture is heated with stirring to a temperature of 80° C. Subsequently, over the course of 2 hours, the remaining amount of the aqueous emulsion and, in parallel but over the course of 2.5 hours, the remaining amount of the aqueous initiator solution are supplied continuously with stirring. The polymerization temperature is 80° C.

Following the end of metered addition of the initiator, polymerization is continued for a further hour.

0.7 g of benzophenone is stirred into the resulting, approximately 50%, aqueous synthetic resin dispersion.

EXAMPLE 2

Comparative

Preparation of an Aqueous Copolymer Dispersion

A monomer mixture of 50 g of n-butyl acrylate, 20 g of 2-ethylhexyl acrylate, 27 g of styrene and 2 g of methacrylic acid, without vinyltrimethoxysilane, with 1.8 g of the Na salt of $C_{12}$-alkyl triglycol ether sulfate is emulsified in 100 g of water.

Subsequently, 10% of an aqueous solution of 0.5 g of sodium peroxodisulfate in 10 g of water is added to 10% of the aqueous emulsion and this mixture is heated with stirring to a temperature of 80° C.

Subsequently, over the course of 2 hours, the remaining amount of the aqueous emulsion and, in parallel but over the course of 2.5 hours, the remaining amount of the aqueous initiator solution are supplied continuously with stirring. The polymerization temperature is 80° C. Following the end of metered addition of the initiator, polymerization is continued for a further hour.

0.7 g of benzophenone is stirred into the resulting, approximately 50%, aqueous synthetic resin dispersion.

EXAMPLE 3

Demonstration of Increased Elasticity and Resilience and Reduced Surface Tack after UV Irradiation, with Only Slightly Reduced Elongation at Break, of the Synthetic Resin Formulations of the Invention The two synthetic resin dispersions of Example 1 and of Comparative Example 2 are converted to films having a dry thickness of 0.5 mm under standard conditions over 7 days. The surface tack is then tested by feeling the films by hand and is assessed in accordance with DIN 53 230 (0=best score, 5=worst score). These films are used in accordance with A. Zosel, "Research on the Properties of cured films of aqueous dispersions of polymers" in Double Liaison Chimie des Peintures—284, October 1987, in order to determine the storage modulus (G'[N/mm²]); 50° C.; 0.1 Hz). In a further experiment, the films are subjected to UV irradiation for 0.5 hour and the surface tack and storage modulus are determined again. The results are set out in Table 1. In order to determine the elongation at break of the dispersion films, films measuring 0.8×3×20 mm are investigated with a series IX materials testing system from Instron, and both the elongation at break and the stress measured at the point of film tear are recorded. In order to determine the resilience of these films, films measuring 0.8×3×20 mm are fastened vertically on a stand and a weight of 200 g is affixed to the lower end of the films. After 24 hours, the extension of the films in % is measured and the weight is removed. After a further 24 hours without the weight (relaxation) the residual extension of the film in % is measured. These results are set out in Table 2.

TABLE 1

| | G' | tanδ = G"/G' | Surface tack (as per DIN 53230) | Tack (scale divisions) |
|---|---|---|---|---|
| Example 1 before UV irradiation | 3.63 | 0, 19 | 3 | 950 |
| after UV irradiation | 4.21 | 0, 16 | 1 | 320 |
| Example 2 before UV irradiation | 1.59 | 0, 48 | 5 | 1450 |
| after UV irradiation | 1.85 | 0, 39 | 4 | 1050 |

TABLE 2

| | Elongation at break (%) | Load [MPa] | Elongation under load (%) | Residual elongation after load (%) |
|---|---|---|---|---|
| Example 1 before UV irradiation | 792 | 3.21 | 280 | 15 |
| after UV irradiation | 675 | 3.45 | 225 | 10 |
| Example 2 before UV irradiation | 3945 | 0.40 | tore | tore |
| after UV irradiation | 797 | 0.87 | tore | tore |

EXAMPLE 4

Demonstration of Increased Water Resistance, Lower Blocking Resistance and Low Reduction in Elongation at Break Following UV Irradiation of Elastic Coatings with the Binder of the Invention Exterior architectural paints are prepared in accordance with the following general composition:

| | |
|---|---|
| 41.0 g | binder |
| 19.4 g | water |
| 0.3 g | hydroxyethylcellulose |
| 0.1 g | tetrasodium pyrophosphate (25% strength solution) |
| 0.2 g | chloroacetamide |
| 0.7 g | white spirit |
| 0.3 g | ammonium salt of a polyacrylic acid (40% strength solution) |
| 0.5 g | silicone-based defoamer |
| 0.2 g | ammonia solution (25% strength) |
| 13.0 g | titanium dioxide (average particle size 1 µm) |
| 5.0 g | talc (average particle size 5 µm) |
| 10.0 g | calcium carbonate (average particle size 2.5 µm) |
| 9.0 g | calcium carbonate (average particle size 5 µm) |
| 0.3 g | a 30% strength polyurethane thickener solution |

The dispersions from Example 1 and from Comparative Example 2 are used as binder.

In order to determine the elongation at break of the paint films, films formed with a 400 µm coating bar and having the dry dimensions 0.12×15×50 mm are investigated using a series IX materials testing system from Instron before and after 28 days of QUV irradiation (in accordance with DIN 53455) and both the elongation at break and the strain measured at the point of film tear are recorded.

In order to determine the resilience of these paint films, films are drawn down with a 1000 μm box-type coating bar and the resulting films, after drying (standard conditions/7 days), measuring 0.32×60×50 mm, are fastened vertically on a stand and a weight of 800 g is affixed to the bottom end of the films. After 24 hours the extension of the films in % is measured and the weight is removed. After a further 24 hours without the weight (relaxation) the residual extension of the film in % is measured.

In determining the blocking resistance, dispersion films, paint films or varnish films are pressed against one-another at room temperature under a defined force [2 kg]. Subsequently, the force in [g] required to separate a defined area of the films (6.25 cm$^2$) from one another again is measured. The blocking resistance is better the lower the force per film area required to separate the films from one another. The blocking resistance is therefore a measure of the surface tack of the films with one another.

The 1st water absorption is determined by measuring the weight increase following water storage of a dried paint film drawn down with an 800 μm coating bar and dried under standard climatic conditions for 7 days, and is reported in per cent based on the initial weight. After drying and further storage in water the 2nd water absorption is determined, which is usually lower, as a result of the fact that some of the emulsifier has been washed out of the film, and thus corresponds to an aged film in comparison with service conditions.

In order to determine the early water resistance, a stripe of the exterior architectural paint in question, measuring about 30 cm long and 6 cm wide, is drawn down onto Leneta film using a box-type coating bar (300 μm gap height) and the film is dried in a climatically controlled chamber (standard climatic conditions) for 2 hours. A photometer is calibrated to 100% using 50 g of deionized water in a Petri dish (diameter 9.5 cm). A film strip measuring 6 cm×26 cm is cut from the drawn down paint films stored in the climatically controlled chamber for 2 hours. This strip is placed with the coated side facing inward around the wall of a 400 ml glass beaker (wide form). 10 g of plastics granules and 300 g of deionized water are weighed out into the glass beaker. On a magnetic stirrer, the contents of the beaker are stirred at about 750 rpm using a magnetic stirring bar so that the granules impact against the coated surface of the film. After stirring times of 1, 2 and 3 hours, the turbidity of the washwater is measured. For this purpose, 50 g of washwater each time are removed, weighed out into the Petri dish, and inserted into the calibrated photometer for measurement of the turbidity. After measurement, the solution is tipped back into the glass beaker. After 3 hours, the film is examined visually for changes.

In order to determine the blistering behavior of the paints, they are applied with good hiding to the front face of a fiber cement slab, using a decorating roller. After a drying period of 24 hours, a second coat is applied in the same way. Judiciously, a plurality of samples are applied to one fiber cement slab. After the second coat has dried for 24 hours, the fiber cement slabs are placed with the coated side downward onto a water bath (blister bath). The water bath temperature is 50° C., the distance of the water surface from the sample slab is 15 cm, and the sample slabs cover the water bath completely. After 8 hours of exposure, the sample slabs are removed from the blister bath and are stood vertically to dry at room temperature. The drying period should be at least 2 hours. Evaluation is made visually on the dried sample. An assessment is made of discoloration, spotting and efflorescence in accordance with a system of ratings (1=very good, no efflorescence or spots; 5=poor, severe spotting and/or efflorescence).

The results given by the measurement methods described above are set out in Table 3.

TABLE 3

| | Example 1 | Example 2 |
|---|---|---|
| elongation at break [%] | 350 | 640 |
| stress [MPa] | 4.1 | 2.2 |
| elongation at break after UV [%] | 285 | 310 |
| stress after UV [MPa] | 4.3 | 2.3 |
| elongation under load [%] | 70 | tore |
| residual elongation after load [%] | 10 | tore |
| blocking resistance [g/6.25 cm$^2$] | 160 | 1000 |
| 1st water absorption [%] | 7 | 10 |
| 2nd water absorption [%] | 6 | 8 |
| blister test | 2 | 2 |
| early water resistance | 1 | 2 |

EXAMPLE 5

Demonstration of Increased Shear Stability of a Dispersion of the Invention in the Presence of Fillers A monomer mixture of 50 g of n-butyl acrylate, 20 g of 2-ethylhexyl acrylate, 27 g of styrene, 2 g of methacrylic acid and 1 g of vinyltrimethoxysilane with 0.3 g of Ambergum 3021® from Aqualon and 1.8 g of the Na salt of a $C_{12}$-alkyl triglycol ether sulfate is emulsified in 100 g of water.

Subsequently, 10% of an aqueous solution of 0.5 g of sodium peroxodisulfate in 10 g of water is added to 10% of the aqueous emulsion and this mixture is heated with stirring to a temperature of 80° C.

Subsequently, over the course of 2 hours, the remaining amount of the aqueous emulsion and, in parallel but over the course of 2.5 hours, the remaining amount of the aqueous initiator solution are supplied continuously with stirring. The polymerization temperature is 80° C. Following the end of metered addition of the initiator, polymerization is continued for a further hour. This dispersion is examined for shear stability in conjunction with the dispersion from Example 1. The solids content of the two dispersions is adjusted to exactly 45% using deionized water. 100 g of the dispersion with 45% solids are mixed with 200 g of coarse calcium carbonate (23 μm average particle size) in a 500 ml beaker by stirring with a glass rod. This mixture is then combined in a dissolver (disk diameter 5 cm) at 1000 revolutions for one minute. The dissolver is then stopped and restarted at a speed of 3000 rpm, and a stopwatch is started at the same time. The mixture is stirred under these conditions until there is a visible loss in stability (coagulation, formation of coarse particles). The period of time between starting the stirrer (at 3000 rpm) and loss of stability of the mixture is reported as a measure of the stability. The results are set out in Table 4.

TABLE 4

|  | Example 1 | Example 5 |
| --- | --- | --- |
| shear stability with fillers [min] | 6.5 | 16.5 |

What is claimed is:

1. An aqueous copolymer dispersion consisting essentially of:
   A) an aqueous dispersion of a copolymer having a solids fraction of from 20 to 65% by weight, said copolymer being composed of
      a) from 40 to 99.9% by weight of at least one ester of, -monoethylenically unsaturated carboxylic acids containing 3 to 6 carbon atoms and alkanols containing 1 to 18 carbon atoms and from 0 to 40% by weight of at least one vinylaromatic compound (monomers a),
      b) from 0.05 to 10% by weight of at least one, -monoethylenically unsaturated mono- or dibasic acid containing 3 to 8 carbon atoms, and/or anhydrides thereof, and from 0 to 10% by weight of at least one, -monoethylenically unsaturated carboxamide which contains 3 to 8 carbon atoms and can be substituted once or twice on the nitrogen by alkyls, alkanols, alkyl sulfates or alkyl ether sulfates containing up to 5 carbon atoms (monomers b),
      c) from 0.05 to 10% by weight of at least one monoethylenically unsaturated crosslinking monomer (monomers c) whereby at least one of the crosslinking monomers c is silane of the formula $CH_2=CH-Si(OX)_3$, a silane of the formula $CH_2=CZ-COO-Y-Si(OX)_3$ or an ethylenically unsaturated derivative of glycidol, in which X is a hydrogen atom, an acyl group or an alkyl group having not more than three carbon atoms, Z is a hydrogen atom or a methyl and/or ethyl group, Y is a group $C_nH_{2n}$ where n=2 to 6, and
      d) from 0 to 30% by weight of at least one other copolymerizable monoethylenically unsaturated monomer (monomers d), in copolymerized form,
      the weight fractions of the monomers a, b, c and d being chosen within the stated limits such that a synthetic resin composed of these monomers alone would have a glass transition temperature in the range from −50 to 35° C.,
   B) from 0 to 10% by weight, based on the copolymer A, of benzophenone, acetophenone, one or more acetophenone derivatives or benzophenone derivatives without an ethylenically unsaturated group, or a mixture thereof,
   C) from 0.3 to 10% by weight, based on the copolymer A, of emulsifiers,
   D) from 0 to 5% by weight, based on the copolymer A, of protective colloids, and wherein the aqueous dispersion does not comprise a compound containing hydrazide groups.

2. An aqueous copolymer dispersion as claimed in claim 1, wherein said esters of α,β-monoethylenically unsaturated carboxylic acids containing 3 to 6 carbon atoms and alkanols containing 1 to 18 carbon atoms are esters of acrylic and/or methacrylic acid.

3. An aqueous copolymer dispersion as claimed in claim 1, wherein said vinylaromatic compound is styrene.

4. An aqueous copolymer dispersion as claimed in claim 1, wherein said α,β-monoethylenically unsaturated mono- or dibasic acids containing 3 to 8 carbon atoms are α,β-monoethylenically unsaturated carboxylic acids or their water-soluble derivatives.

5. An aqueous copolymer dispersion as claimed in claim 1, wherein said α,β-monoethylenically unsaturated carboxamide is methacrylamide.

6. An aqueous copolymer dispersion as claimed in claim 1, wherein said crosslinking monomers c are vinyltrimethoxysilane, vinyltriethoxysilane, α-methacryloxy-propyltrimethoxysilane, glycidiyl (meth)acrylates and/or glycidylvinyl ethers.

7. An aqueous copolymer dispersion as claimed in claim 1, wherein the weight fractions of the monomers a, b, c and d are selected such that a synthetic resin composed of these monomers alone would have a glass transition temperature of from −40 to 10° C.

8. An aqueous copolymer dispersion as claimed in claim 1, wherein said component B is benzophenone and/or a benzophenone derivative without an ethylenically unsaturated group.

9. An aqueous copolymer dispersion as claimed in claim 1, wherein said emulsifiers C are nonionic and/or ionic emulsifiers.

10. An aqueous copolymer dispersion as claimed in claim 1, wherein said protective colloid D comprises water-soluble carboxymethylcelluloses having a degree of substitution of from 0.4 to 2.9.

11. A process for preparing an aqueous copolymer dispersion as claimed in claim 1, which comprises subjecting the monomers a, b, c and d to free-radical emulsion polymerization in an aqueous medium in the presence of water-soluble, free-radical-forming initiators, emulsifiers C and, if desired, protective colloids D, regulators and/or further auxiliaries.

12. A composition comprising the aqueous copolymer dispersion as claimed in claim 1, wherein the composition is selected from the group consisting of coating compositions for walls, floors and ceilings, marking paints for paths and highways, and renders.

13. An aqueous copolymer dispersion comprising:
   A) an aqueous dispersion of a copolymer having a solids fraction of from 20 to 65% by weight, said copolymer being composed of
      a) from 40 to 99.9% by weight of at least one ester of, -monoethylenically unsaturated carboxylic acids containing 3 to 6 carbon atoms and alkanols containing 1 to 18 carbon atoms and from 0 to 40% by weight of at least one vinylaromatic compound (monomers a),
      b) from 0.05 to 10% by weight of at least one, -monoethylenically unsaturated mono- or dibasic acid containing 3 to 8 carbon atoms, and/or anhydrides thereof, and from 0 to 10% by weight of at least one, -monoethylenically unsaturated carboxamide which contains 3 to 8 carbon atoms and can be substituted once or twice on the nitrogen by alkyls, alkanols, alkyl sulfates or alkyl ether sulfates containing up to 5 carbon atoms (monomers b),
      c) from 0.05 to 10% by weight of at least one monoethylenically unsaturated crosslinking monomer (monomers c) whereby at least one of the crosslinking monomers c is silane of the formula $CH_2=CH-Si(OX)_3$, a silane of the formula $CH_2=CZ-COO-Y-Si(OX)_3$ or an ethylenically unsaturated derivative of glycidol, in which X is a hydrogen atom, an acyl group or an alkyl group having not more than three carbon atoms, Z is a hydrogen atom or a methyl and/or ethyl group, Y is a group $C_nH_{2n}$ where n=2 to 6, and d) from 0 to 30% by weight of at least one other copolymerizable monoethylenically unsaturated monomer (monomers d), in copolymerized form, the weight fractions of the monomers a, b, c and d being chosen within the stated limits such that a synthetic resin composed of these monomers alone would have a glass transition temperature in the range from −50 to 35° C., B) from 0 to 10% by weight, based on the copolymer A, of benzophenone, acetophenone, one or more acetophenone derivatives or benzophenone derivatives without an ethylenically unsaturated group, or a mixture thereof, C) from 0.3 to 10% by weight, based on the copolymer A, of emulsifiers, D) from 0 to 5% by weight, based on the copolymer A, of protective colloids, and wherein the aqueous dispersion does not comprise a compound containing hydrazide groups.

14. An aqueous copolymer dispersion consisting of:

A) an aqueous dispersion of a copolymer having a solids fraction of from 20 to 65% by weight, said copolymer being composed of a) from 40 to 99.9% by weight of at least one ester of, -monoethylenically unsaturated carboxylic acids containing 3 to 6 carbon atoms and alkanols containing 1 to 18 carbon atoms and from 0 to 40% by weight of at least one vinylaromatic compound (monomers a), b) from 0.05 to 10% by weight of at least one , -monoethylenically unsaturated mono- or dibasic acid containing 3 to 8 carbon atoms, and/or anhydrides thereof, and from 0 to 10% by weight of at least one, -monoethylenically unsaturated carboxamide which contains 3 to 8 carbon atoms and can be substituted once or twice on the nitrogen by alkyls, alkanols, alkyl sulfates or alkyl ether sulfates containing up to 5 carbon atoms (monomers b), c) from 0.05 to 10% by weight of at least one monoethylenically unsaturated crosslinking monomer (monomers c) whereby at least one of the crosslinking monomers c is silane of the formula $CH_2$=CH—$Si(OX)_3$, a silane of the formula $CH_2$=CZ—COO—Y—$Si(OX)_3$ or an ethylenically unsaturated derivative of glycidol, in which X is a hydrogen atom, an acyl group or an alkyl group having not more than three carbon atoms, Z is a hydrogen atom or a methyl and/or ethyl group, Y is a group $C_nH_{2n}$ where n=2 to 6, and d) from 0 to 30% by weight of at least one other copolymerizable monoethylenically unsaturated monomer (monomers d), in copolymerized form, the weight fractions of the monomers a, b, c and d being chosen within the stated limits such that a synthetic resin composed of these monomers alone would have a glass transition temperature in the range from −50 to 35° C., B) from 0 to 10% by weight, based on the copolymer A, of benzophenone, acetophenone, one or more acetophenone derivatives or benzophenone derivatives without an ethylenically unsaturated group, or a mixture thereof, C) from 0.3 to 10% by weight, based on the copolymer A, of emulsifiers, and D) from 0 to 5% by weight, based on the copolymer A, of protective colloids.

* * * * *